(12) United States Patent
Agnew et al.

(10) Patent No.: US 11,876,907 B1
(45) Date of Patent: *Jan. 16, 2024

(54) AUTHENTICATION TOKEN MANAGEMENT

(71) Applicant: Wells Fargo Bank, N.A., San Francisco, CA (US)

(72) Inventors: Joseph Benjamin Agnew, Charlotte, NC (US); Christopher Robin Sharpe, Charlotte, NC (US); Daniel S. Sumner, Matthews, NC (US); Douglas Innocenti, Huntersville, NC (US); Joel Gardner, Charlotte, NC (US); Kevin Potter, Charlotte, NC (US); Michael J. Martindale, San Francisco, CA (US); Raymond Creed Lowers, Harrisburg, NC (US); Wesley Donald Duncan, Charlotte, NC (US); Zoe Tierney, Chevy Chase, MD (US); Wendy Davidson, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 11 days.

This patent is subject to a terminal disclaimer.

(21) Appl. No.: 17/805,401

(22) Filed: Jun. 3, 2022

Related U.S. Application Data

(63) Continuation of application No. 15/899,245, filed on Feb. 19, 2018, now Pat. No. 11,356,259.

(51) Int. Cl.
  *G06F 21/62* (2013.01)
  *H04L 9/32* (2006.01)
  *H04L 9/40* (2022.01)

(52) U.S. Cl.
  CPC ............ *H04L 9/3213* (2013.01); *G06F 21/62* (2013.01); *H04L 9/3271* (2013.01);
  (Continued)

(58) Field of Classification Search
  CPC . H04L 9/3213; H04L 9/3271; H04L 63/0861; H04L 63/102; H04L 63/308; G06F 21/62
  See application file for complete search history.

(56) References Cited

U.S. PATENT DOCUMENTS 8,037,295 B2  10/2011  Lin
8,533,118 B2  9/2013  Weller et al.
(Continued)

FOREIGN PATENT DOCUMENTS

WO  2017035486 A1  3/2017

OTHER PUBLICATIONS

Experian, "Knowledge Based Authentication," retrieved from http://www.experian.com/decision-analytics/identity-and-fraud/knowledge-based-authentication.html on Sep. 25, 2017, 2 pp.
(Continued)

*Primary Examiner* — Lynn D Feild
*Assistant Examiner* — Vladimir I Gavrilenko
(74) *Attorney, Agent, or Firm* — Shumaker & Sieffert, P.A.

(57) ABSTRACT

Techniques are described for managing authentication tokens associated with a secure account maintained by a business or organization. In one example, this disclosure describes a method that includes storing interaction information associated with an account maintained by an organization, wherein the interaction information includes information about authentication tokens used during a plurality of prior authentication procedures performed for the account, receiving, over a network, a request to authenticate a user to access the account, determining, based on the stored interaction information, an authentication token to be used to authenticate the user, wherein the authentication token is different than a prior authentication token used during the plurality of prior authentication procedures performed for
(Continued)

the account, presenting a prompt for the authentication token; and determining, based on information received in response to the prompt, whether the user is authorized to access the account.

20 Claims, 9 Drawing Sheets

(52) U.S. Cl.
CPC ........ H04L 63/0861 (2013.01); H04L 63/102 (2013.01); H04L 63/308 (2013.01)

(56) References Cited

U.S. PATENT DOCUMENTS

| | | |
|---|---|---|
| 8,990,909 B2 | 3/2015 | Kelley |
| 9,197,406 B2 | 11/2015 | Ganesan |
| 9,392,456 B2 | 7/2016 | Disraeli et al. |
| 9,503,584 B2 | 11/2016 | Defoort |
| 9,516,126 B1 | 12/2016 | Montenegro et al. |
| 11,356,259 B1* | 6/2022 | Agnew ................ H04L 9/3213 |
| 2014/0289833 A1* | 9/2014 | Briceno ................ H04L 9/006 |
| | | 726/5 |
| 2015/0227725 A1* | 8/2015 | Grigg ..................... G06F 21/31 |
| | | 726/7 |
| 2018/0063152 A1* | 3/2018 | Erich ................ H04L 63/0861 |
| 2018/0321918 A1 | 11/2018 | Mcclory et al. |
| 2019/0141041 A1* | 5/2019 | Bhabbur ................ G06F 21/62 |
| 2022/0277306 A1* | 9/2022 | Levitt ............... G06Q 20/4014 |

OTHER PUBLICATIONS

Prosecution History from U.S. Appl. No. 15/899,245, dated Dec. 18, 2019 through May 10, 2022, 236 pp.

Twilio, "Two-Factor Authentication (2FA)," retrieved from https://www.twilio.com/use-cases/two-factor-authentication on Sep. 25, 2017, 4 pp.

* cited by examiner

Account Information for John Doe

SSN: XXX-XX-1234 [PROVIDED?] — 306

Branches visited recently:
Uptown [PROVIDED?]
South Park [PROVIDED?]

Address:
123 Main Street [PROVIDED?]
Anytown, N.C. 28202 [PROVIDED?]

Personal Account:
Account No. 134312 [PROVIDED?]
Balance $13,023.00 [PROVIDED?]
12/22/2017 $23.42 Pizza Palace [PROVIDED?]
12/21/2017 $1211.32 loan payment [PROVIDED?]

Joint Account:
Account No. 134313 [PROVIDED?]
Balance $4,023.00 [PROVIDED?]
12/21/2017 $31.22 XYZ Restaurant [PROVIDED?]
12/11/2017 $51.32 utility payment [PROVIDED?]

Personal Banking
Steps to authenticate:

Step 1: Ask for current address

[NEXT STEP] — 308

FIG. 3A

Personal Banking

Account Information for John Doe

SSN: XXX-XX-1234 [PROVIDED?]

Branches visited recently:
Uptown [PROVIDED?]
South Park [PROVIDED?]

Address:
123 Main Street [PROVIDED?]
Anytown, N.C. 28202 [PROVIDED?]

Personal Account:
Account No. 134312 [PROVIDED?]
Balance: $13,023.00 [PROVIDED?]
12/22/2017 $23.42 Pizza Palace [PROVIDED?]
12/21/2017 $1211.32 loan payment [PROVIDED?]

Joint Account:
Account No. 134313 [PROVIDED?]
Balance: $4,023.00 [PROVIDED?]
12/21/2017 $31.22 XYZ Restaurant [PROVIDED?]
12/11/2017 $51.32 utility payment [PROVIDED?]

[AUTHENTICATE USER] 411

Account Information for John Doe

SSN: XXX-XX-1234 [PROVIDED?]

Branches visited recently:
Uptown [PROVIDED?]
South Park [PROVIDED?]

Address:
123 Main Street
Anytown, N.C. 28202 [PROVIDED?] [PROVIDED?]

Personal Account:
Account No. 134312
Balance: $13,023.00
12/22/2017 $23.42 Pizza Palace [PROVIDED?]
12/21/2017 $1211.32 loan payment [PROVIDED?]

Joint Account:
Account No. 134313
Balance: $4,023.00
12/21/2017 $31.22 XYZ Restaurant [PROVIDED?]
12/11/2017 $51.32 utility payment [PROVIDED?]

---

Personal Banking

User was successfully authenticated by an interactive voice response system.

Functions:

- LOST CREDIT CARD — 412
- TRANSFER MONEY — 412
- DISPUTE A CHARGE — 412
- TRANSFER TO MORTGAGE — 412

401B

122

AUTHENTICATION TOKEN MANAGEMENT

CROSS REFERENCE

This application is a continuation application of and claims priority to U.S. patent application Ser. No. 15/899,245 filed on Feb. 19, 2018, which is hereby incorporated by reference herein in its entirety.

TECHNICAL FIELD

This disclosure relates to communications on a network, and more specifically, to analyzing communications and data relating to authentication.

BACKGROUND

Some organizations or businesses have more than one way of handling customer service inquiries. While many customer services inquiries are handled through online interactions (e.g., a web site, email communications), retail businesses, for example, typically address at least some inquiries at retail locations. Banks and financial institutions, in particular, often have multiple and widespread retail locations (e.g. "bank branches") for providing in-person customer service. Banks and financial institutions also, however, typically also provide access to other customer service channels, including call centers. A call center is a facility for handling incoming voice calls from customers or potential customers of a business. Typically, a call center is staffed with a number of agents, often located in the same office, who are representatives of the business and have access to information about the business or about existing customers of that business. For a bank call center, for example, in order to properly service a customer's inquiry, the identity of the customer is typically required, or in other words, the customer must be authenticated to access information about an account at the bank and control assets associated with the account.

SUMMARY

Aspects of this disclosure relate to techniques for managing authentication tokens associated with a secure account maintained by a business or organization. Techniques in accordance with one or more aspects of the present disclosure include improved procedures for systematically authenticating users seeking access to an account, and may prevent unauthorized access and limit fraud. As described in one or more examples, techniques may involve providing instructions to an agent (e.g., a call center agent) describing how to properly authenticate a caller seeking access to an account, where such instructions are based on an analysis of prior interactions involving the account.

In one example, this disclosure describes a computing system comprising processing circuitry and a storage device, wherein the processing circuitry has access to the storage device and is configured to: receive, over a network, a request to gain access to an account maintained by an organization; determine, based on interaction information, an authentication token to be used in an authentication procedure in response to the request to gain access, wherein the interaction information includes information about prior authentication tokens used during a plurality of interactions associated with the account and information about a frequency of the interactions, and wherein the authentication token is different than the prior authentication tokens used during the plurality of interactions; present a prompt for the authentication token; and determine, based on information received in response to presenting the prompt, whether to grant the request to authenticate.

In another example, this disclosure describes a method comprising: receiving, by a computing system and over a network, a request to gain access to an account maintained by an organization; determining, by the computing system and based on interaction information, an authentication token to be used in an authentication procedure in response to the request to gain access, wherein the interaction information includes information about prior authentication tokens used during a plurality of interactions associated with the account and information about a frequency of the interactions, and wherein the authentication token is different than the prior authentication tokens used during the plurality of interactions; presenting a prompt for the authentication token; and determining, based on information received in response to presenting the prompt, whether to grant the request to authenticate.

In another example, this disclosure describes a computer-readable medium comprising instructions that, when executed, configure processing circuitry of a computing system to: receive, over a network, a request to gain access to an account maintained by an organization; determine, based on interaction information, an authentication token to be used in an authentication procedure in response to the request to gain access, wherein the interaction information includes information about prior authentication tokens used during a plurality of interactions associated with the account and information about a frequency of the interactions, and wherein the authentication token is different than the prior authentication tokens used during the plurality of interactions; present a prompt for the authentication token; and determine, based on information received in response to presenting the prompt, whether to grant the request to authenticate.

The details of one or more examples of the disclosure are set forth in the accompanying drawings and the description below. Other features, objects, and advantages of the disclosure will be apparent from the description and drawings, and from the claims.

BRIEF DESCRIPTION OF THE DRAWINGS

FIG. 3A, FIG. 3B, and FIG. 3C are conceptual diagrams illustrating example user interfaces presented by an example agent workstation, in accordance with one or more aspects of the present disclosure.

FIG. 4A and FIG. 4B are conceptual diagrams illustrating example user interfaces presented by an example agent workstation, in accordance with one or more aspects of the present disclosure.

DETAILED DESCRIPTION

Figure 1:
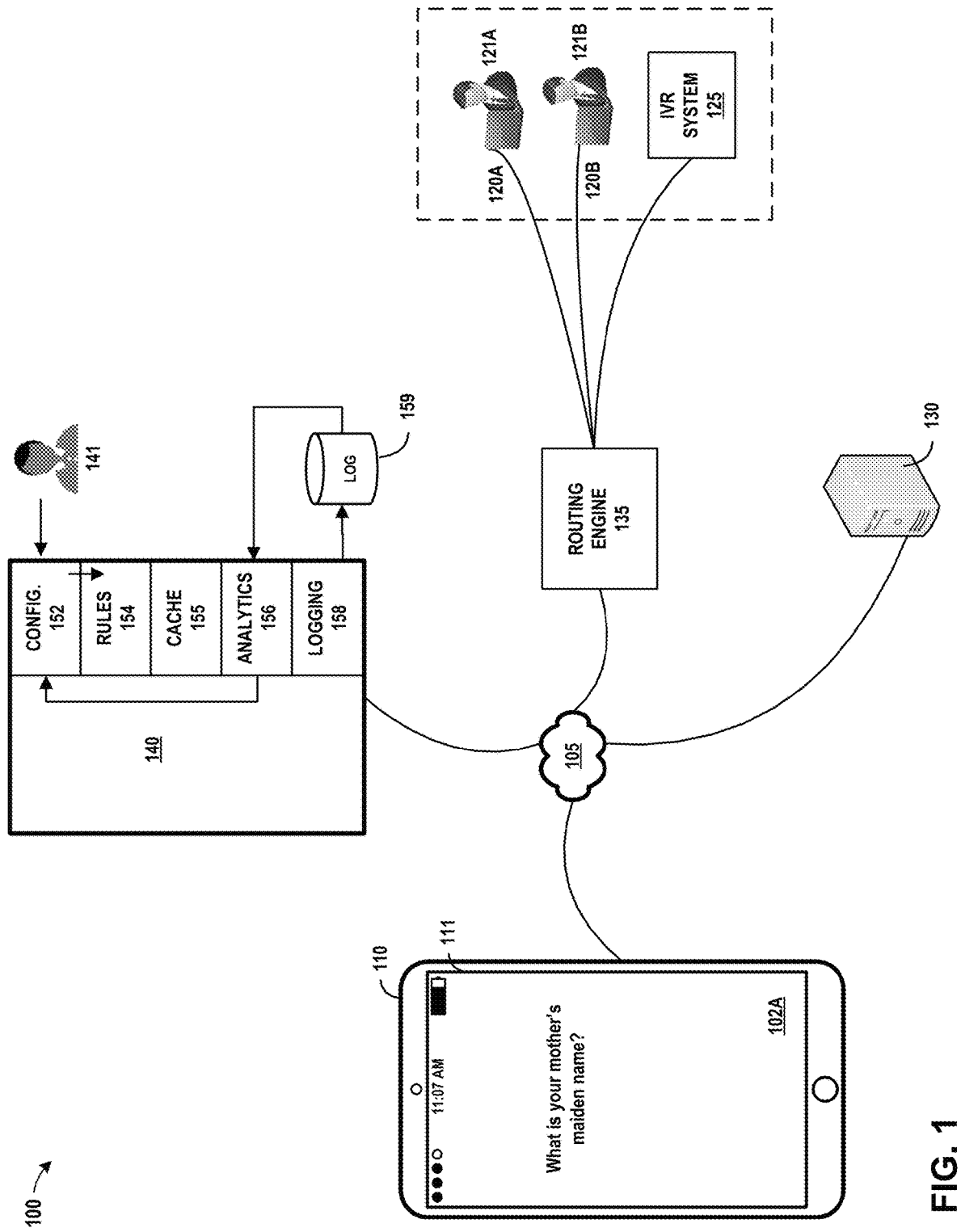
FIG. 1 is a conceptual diagram illustrating an example system that manages procedures for authenticating a user over the course of multiple sessions, in accordance with one or more aspects of the present disclosure.

FIG. 1 is a conceptual diagram illustrating an example system that manages procedures for authenticating a user over the course of multiple sessions, in accordance with one or more aspects of the present disclosure. In some examples, each session is associated with an account managed or administered by an organization or business, such as a bank or financial institution. In the examples described, access to the account requires the user seeking access to authenticate pursuant to an authentication procedure.

FIG. 1 illustrates mobile phone 110, computing system 140, application server 130, and routing engine 135 in communication over network 105. Mobile phone 110 is a device that a user can use to interact with an organization or business, such as a bank or financial institution. For example, application server 130 may be administered or controlled by a bank or other financial institution, and mobile phone 110 may interact with application server 130 when executing a banking application. Mobile phone 110 may also initiate, in response to user input, a phone call to one or more of agent workstations 120, each operated by an agent of a bank or financial institution. For example, routing engine 135 may route calls initiated by mobile phone 110 to agent workstations 120 operated by agent 121. Routing engine 135 may also route calls from mobile phone 110 to interactive voice response system 125. Further, agent workstations 120 and interactive voice response system 125 may communicate with other devices or systems illustrated in FIG. 1 through a direct data connection to network 105 (not shown), and therefore communications involving agent workstations 120 and interactive voice response system 125 need not always be routed through routing engine 135.

Although described as a mobile phone, mobile phone 110 could represent any suitable communication or computing device, such as a conventional or landline phone, or a mobile, non-mobile, wearable, and/or non-wearable computing device. In general, mobile phone 110 may represent a smart phone, a tablet computer, a computerized watch, a computerized glove or gloves, a personal digital assistant, a virtual assistant, a gaming system, a media player, an e-book reader, a television or television platform, a bicycle, automobile, or navigation, information and/or entertainment system for a bicycle, automobile or other vehicle, a laptop or notebook computer, a desktop computer, or any other type of wearable, non-wearable, mobile, or non-mobile computing device that may perform operations in accordance with one or more aspects of the present disclosure.

Routing engine 135 may represent a call routing system or call center system that may operate and/or perform functions in response to interactions with various devices or systems of system 100. In some examples, routing engine 135 may be implemented using call routing solutions available through Genesys Telecommunications Laboratories. Routing engine 135 may route calls to one of a number of destinations, including to agents 121 (or to agent workstations 120 operated by such agents 121), interactive voice response system 125, or to other devices, users, or systems. In some examples, routing engine 135 may initiate calls on behalf of other devices, such as application server 130.

Computing system 140 provides services to assist with the task of authenticating a user in a secure and efficient manner. Computing system 140 may include a number of components, as illustrated in FIG. 1. For instance, configuration component 152 may, based on input from analytics component 156 or from administrator 141, create initial or new authentication tokens, create and/or configure rules based on new or updated policies or fraud analytics. In some examples, rules may define which authentication tokens are to be used in various situations, or whether a previously-used authentication token can be used again. Rules component 154 applies rules, again based on administrator input and/or fraud analytics, that determine how and what authentication tokens are used when authenticating a user. In some examples, token cache 155 may be used to store tokens during the authentication process, and may be used to track the state of the authentication process. Analytics component 156 drives rule configuration in configuration component 152 based on fraud activity derived from data store 159 and/or from fraud service analytics. Logging component 158 logs data collected during or after calls, and in some examples, moves data in near or seemingly-near real time to data store 159.

In some examples described herein, computing system 140 is primarily described as a system for managing authentication procedures for calls to a call center. However, the procedures described herein may also apply to other contexts, such as authentication procedures for authenticating a visitor to a bank branch, or other scenarios in which authenticated interactions with an organization or business are required or preferred. Further, techniques performed by computing system 140 may also apply to managing authentication procedures for mobile or desktop online access to accounts, which might or might not include interactions with a live agent of the organization or business associated with such accounts. Accordingly, although often described in terms of authentication procedures performed during interactions with a call center agent, aspects of the present disclosure may apply to other situations, and in some examples, computing system 140 may therefore be used to provide services to all channels (e.g., web, mobile, IVR, call center, personal visits, etc.) through which access to an account is sought.

In the example of FIG. 1, and in accordance with one or more aspects of the present disclosure, mobile phone 110 may initiate a call to an agent. For instance, in the example of FIG. 1, mobile phone 110 detects input that mobile phone 110 determines corresponds to a phone number. Mobile phone 110 further detects input that mobile phone 110 determines corresponds to a request to place a call to the phone number. Mobile phone 110 outputs a signal over network 105. Routing engine 135 detects a signal over network 105 and determines that the signal corresponds to an indication of an incoming call. Routing engine 135 further determines that the signal corresponds to a request to engage in a voice conversation with an agent (e.g., agent 121A). Routing engine 135 routes the call to agent workstation 120A and connects the call, thereby enabling a user of mobile phone 110 and a user of agent workstation 120A (e.g., agent 121A) to engage in a voice communication session. Agent workstation 120A detects the call and communicates with computing system 140, notifying computing system 140 that a voice conversation between a user and agent 121A is occurring or may be about to occur.

Agent workstation 120A may receive information sufficient to identify an account. For instance, in the example of FIG. 1, agent 121A may, during the voice communication session, ask the user of mobile phone 110 for information to identify an account. In response, the user of mobile phone 110 may, in one example, respond by identifying himself as "John Doe" during the call. In other examples, the user of mobile phone 110 may provide an account number or other identifying information. Agent 121A hears audio generated by agent workstation 120A corresponding to the user of mobile phone 110 saying "John Doe," and agent 121A provides input to agent workstation 120A corresponding to the name. Agent workstation 120A detects the input, and agent workstation 120A determines that the input corresponds to a name provided by the user operating mobile phone 110. In the example described, a name may be sufficient to uniquely identify an account.

Computing system 140 may generate instructions for authenticating the user of mobile phone 110 for use by agent 121A. For instance, in the example of FIG. 1, agent workstation 120A outputs a signal over network 105. Computing system 140 detects a signal over network 105 and determines that the signal corresponds to a request for instructions for authenticating a user to access information about John Doe's account. Computing system 140 applies rules component 154 and generates appropriate instructions, tailored to John Doe's account. Computing system 140 outputs a signal over network 105. Agent workstation 120A detects a signal and determines that the signal includes information about the instructions generated by computing system 140. Agent workstation 120A presents some or all of the instructions to agent 121A (e.g., through a user interface presented by a display associated with agent workstation 120A). In the example described, the user interface instructs agent 121A to prompt the user of mobile phone 110, during the voice call session, for one or more authentication tokens. In some examples, such prompts may be in the form of authentication challenges (e.g., "what's your mother's maiden name?"). Based on responses heard by agent 121A, agent 121A may make a determination about whether the user is John Doe or has otherwise been authenticated (i.e., the user is authorized to access John Doe's account).

Computing system 140 may log information about the call between agent 121A and the user of mobile phone 110. For instance, in the example of FIG. 1, agent workstation 120A detects input. In response to detecting such input, agent workstation 120A outputs a signal over network 105. Computing system 140 detects the signal and determines that the signal includes information about the call between agent 121A and the user of mobile phone 110. In some examples, the input corresponds to notes taken by agent 121A during the call. Such notes may correspond to agent 121A providing input to agent workstation 120A upon hearing the audible response, from the user of mobile phone 110, to a prompt presented by agent 121A. In other examples, the input corresponds to authentication tokens used or audio information corresponding to the voice conversation between agent 121A and the user of mobile phone 110. Agent workstation 120A and computing system 140 may engage in further communications over network 105, as, for example, computing system 140 provides further instructions to agent workstation 120A, and as agent workstation 120A provides further feedback to agent workstation 120A, which is then communicated to computing system 140. During such communications, computing system 140 may store during the session, in token cache 155, authentication tokens used and/or information about authentication state or status. Logging component 158 of computing system 140 logs data derived from the voice session between mobile phone 110 and agent workstation 120A. Logging component 158 may also log and/or record, within data store 159, some or all of the audio of the voice session.

During or after the call, analytics component 156 of computing system 140 may analyze the information stored in data store 159 and determine whether to generate any new rules or any adjustments to any existing rules. For instance, analytics component 156 may provide input to configuration component 152 identifying the tokens used during the voice session, and whether those tokens were successfully used by the user of mobile phone 110. Analytics component 156 may update rules component 154 so that some or all of those same tokens are not used in the next or a later session. Analytics component 156 may provide input to configuration component 152 identifying information that the user of mobile phone 110 did not know during the voice session. Configuration component 152 may update rules component 154 so that authentication tokens relating to information that the user did not know are not used again. Analytics component 156 may provide input to configuration component 152 identifying the frequency or velocity of calls (or other interactions) relating to John Doe's account during a recent time period. Configuration component 152 may update rules component 154 to require a higher level of authentication for one or more accounts that have received a high velocity of calls or other interactions. In some examples, rules component 154 may include a rule that automatically increases the level of authentication for accounts that have experienced a high frequency of attempted and/or failed authentication attempts. Analytics component 156 may provide input to configuration component 152 identifying information that agent 121 provided to the user of mobile phone 110 during the voice session. Configuration component 152 may update rules component 154 to ensure that the information provided by agent 121 is not thereafter (or soon thereafter) used as an authentication token. Analytics component 156 may provide input to configuration component 152 indicating that, for example, a user of mobile phone 110 unsuccessfully sought to transfer money out of John Doe's account. Configuration component 152 may update rules component 154 to ensure that thereafter, a higher level of authentication is required for requested funds transfers.

Computing system 140 may manage a later attempt to access John Doe's account. For instance, still referring to FIG. 1, and some period of time (e.g., minutes, hours, weeks, months, or longer) after the earlier call described above, mobile phone 110 initiates a call to an agent. Routing engine 135 detects a signal over network 105 and determines that the signal corresponds to an incoming call from mobile phone 110. Routing engine 135 further determines that the signal corresponds to a request to engage in a voice conversation with an agent. Routing engine 135 routes the call to agent workstation 120B and connects the call, thereby enabling a user of mobile phone 110 and a user of agent workstation 120B (e.g., agent 121B) to engage in a voice communication session. In the example of FIG. 1, the call is described as originating from mobile phone 110, although in other examples, the call might originate from another device. Further, in the example described, agent 121B is a different agent than agent 121A, so agent 121B is unlikely to have personal knowledge of the earlier communications with the user of mobile phone 110. Agent workstation 120B detects the call and communicates with computing system 140, notifying computing system 140 that a voice conversation between a user and agent 121B is occurring or is about to occur.

Computing system 140 may use information from one or more earlier calls to determine an appropriate procedure to authenticate a later call. For instance, again referring to FIG. 1, computing system 140 detects input that computing system 140 determines corresponds to an indication that during the later call being described, a user of mobile phone 110 is seeking to gain access to John Doe's account. Computing system 140 applies rules component 154, as updated based on data logged during or after the prior call, and generates a set of instructions, tailored to John Doe's account, and incorporating any updates to rules component 154 based on analytics performed relating to the prior call. Computing system 140 outputs a signal over network 105. Agent workstation 120B detects a signal and determines that the signal includes information about the instructions generated by computing system 140. Agent workstation 120B presents the instructions to agent 121B (e.g., through a display associated with agent workstation 120B), and instructs agent 121B to prompt the user of mobile phone 110, during the voice call session, for one or more authentication tokens.

Agent workstation 120B and computing system 140 communicate as an attempt to authenticate the user of mobile phone 110 is made. For instance, computing system 140 may provide further instructions during the authentication process, perhaps based on feedback received from agent workstation 120B. Logging component 158 may log information about the communications within data store 159. Analytics component 156 again analyzes the information stored in data store 159 and provides input to configuration component 152, which may prompt configuration component 152 to update rules component 154 reflecting data logged in the call. In some examples, the updated rules may apply to later calls in which a user seeks to be authenticated to access John Doe's account. In other examples, aspects of the updated rules may apply to the same call for which data is being logged. In other words, in some examples, the data stored in data store 159 during a call may be used to modify rules applied to that same call.

In the examples described, computing system 140 provides a set of instructions to an agent (e.g., agent 121A and agent 121B), and that agent then issues authentication challenges to the user of mobile phone 110. In other words, agent 121A and agent 121B each prompt the user of mobile phone 110, during the voice communications session, for authentication tokens. Agent 121B may, for example, ask the user of mobile phone 110 for an authentication token, such as the user's mother's maiden name. Upon hearing the response of the user of mobile phone 110, agent 121B may determine whether the response is correct, based on information presented to agent 121B by agent workstation 120B (e.g., on a user interface presented by agent workstation 120B).

In another example, computing system 140 may relieve the agent of the task of administering authentication challenges (e.g., asking questions and evaluating the caller's answers). For instance, in one such example involving a call between agent 121B and a user of mobile phone 110, agent workstation 120B outputs a signal over network 105. Computing system 140 detects a signal, and determines that the signal corresponds to a request to present one or more authentication challenges to a user of mobile phone 110. Computing system 140 outputs a signal over network 105. Mobile phone 110 detects a signal and determines that the signal corresponds to a message that includes an authentication challenge. Mobile phone 110 presents user interface 102A at display 111 of mobile phone 110, inviting a user of mobile phone 110 to respond to an authentication challenge. Mobile phone 110 detects input and outputs a signal over mobile phone 110. Computing system 140 detects a signal over network 105 and determines that the signal includes a response to the authentication challenge. Computing system 140 evaluates whether the response is correct.

Computing system 140 may inform agent 121B whether the user of mobile phone 110 answered the authentication challenge correctly. For instance, in the example of FIG. 1, computing system 140 outputs, over network 105, a signal. Agent workstation 120B detects a signal over network 105 and determines that the signal includes information sufficient to present a user interface. Agent workstation 120B presents a user interface providing information about whether the user of mobile phone 110 successfully responded to the authentication challenge. If the user of mobile phone 110 successfully responded, agent 121B enables the call to continue. If the user of mobile phone 110 did not successfully respond, agent 121B may end the call, cause another authentication challenge to be presented to a user of mobile phone 110, or take another action. In some examples corresponding to the procedure just described, agent 121B neither knows the question nor the answer (i.e., authentication token) associated with the authentication challenge, and agent 121B might only be informed whether the user of mobile phone 110 successfully answered the authentication challenge.

The procedure just described for enabling computing system 140 to administer authentication challenges could be enabled by an application executing on mobile phone 110. However, a similar procedure could be employed through other means, including through questions sent via SMS to mobile phone 110. In another example, computing system 140 may cause an ongoing call to be transferred to interactive voice response system 125. In such an example, interactive voice response system 125 may present the authentication challenge, evaluate whether the challenge was answered correctly, and transfer the call back to agent workstation 120B with an indication of whether the challenge was answered correctly. In still other examples, computing system 140 may present an authentication challenge that requires mobile phone 110 to access other information, such as a web page, or an email. In this way, the function of presenting and evaluating responses to authentication challenges may be automated, relieving agent 121B of the task. By taking the authentication challenge function out of the hands of agent 121B, consistency and reliability of the authentication challenge procedure may increase, and inadvertent disclosures of authentication tokens may be less likely.

In the examples described, mobile phone 110 initiates, in response to user input, a call to a device operated by an agent, and the call is routed to an appropriate agent workstation 120 by routing engine 135. In other examples, such a call may be initiated in other ways. For instance, in one example, mobile phone 110 may initially be interacting with interactive voice response system 125 in a voice session. In such an example, interactive voice response system 125 may detect input that it determines corresponds to a request to speak to an agent. In response, interactive voice response system 125 may interact with routing engine 135 to cause the voice session to be transferred to a device (e.g., agent workstation 120A or agent workstation 120B) operated by an agent (e.g., agent 121A or agent 121B). A voice session may thereafter take place between a user of mobile phone 110 and an agent at an agent workstation. During the session, computing system 140 may, as described above, manage any authentication performed by the agent, monitor communications between mobile phone 110 and the agent workstation, log data, cause analytics component 156 to perform analytics on the logged data, and reconfigure and/or update the rules component 154.

In another example, mobile phone 110 may be executing an application that involves interactions with application server 130 over network 105. Such an application may, in some examples, execute without requiring a voice session. Accordingly, during such interactions, no existing call has been instantiated or routed through routing engine 135. During such a session, computing system 140 may nevertheless manage any authentication procedures or processes. In one such example, computing system 140 provides an API or a service, invoked by application server 130 over network 105, when an authentication procedure is initiated. Such a service may provide authentication procedures to application server 130 that relate to a particular secured account, and are based on prior interactions with that account, whether through online interactions, call center interactions, visits to a retail location (or bank branch), or any other interactions with an account monitored by computing system 140. In some examples, services provided by computing system 140 may include generating information to be included in a user interface (e.g., authentication challenges) that application server 130 sends to mobile phone 110, or evaluating responses to such challenges.

Further, computing system 140 may continue to manage authentication procedures when one type of interaction is transformed into another type of interaction. For instance, in the example where mobile phone 110 is executing an application that invokes services of application server 130, application server 130 may detect input that it determines corresponds to a request, made through input detected within the mobile application, to speak to an agent. In response, application server 130 outputs a signal over network 105. Routing engine 135 detects a signal and instantiates a voice call session between mobile phone 110 and an agent (e.g., agent 121A or agent 121B). A voice communications session may thereafter take place between a user of mobile phone 110 and an agent at an agent workstation. During the voice communications session, computing system 140 may monitor communications between mobile phone 110 and the agent workstation, log data, cause analytics component 156 to perform analytics on the logged data, and reconfigure and/or update the rules component 154. The voice session may take place along with the data session between mobile phone 110 and application server 130, or, in other examples, the voice session may replace the data session between mobile phone 110 and application server 130.

FIG. 1 illustrates one example implementation of system 100. Although examples are described herein in terms of authenticating a user interacting with an agent (e.g., a call center agent) of a bank or financial institution, techniques described herein may apply to other interactions and other types of businesses and/or organization, and the scope of this disclosure is not limited to the examples provided herein. Accordingly, other example or alternative implementations of system 100 may be appropriate in other instances. Such implementations may include a subset of the devices and/or components included in the example of FIG. 1 and/or may include additional devices and/or components not shown in FIG. 1. Therefore, although one or more implementations of system 100 have been described with reference to FIG. 1, system 100 may be implemented in a number of different ways.

For instance, one or more devices of system 100 that may be illustrated as separate devices may alternatively be implemented as a single device; one or more components of system 100 that may be illustrated as separate components may alternatively be implemented as a single component. Also, in some examples, one or more devices of system 100 that may be illustrated as a single device may alternatively be implemented as multiple devices; one or more components of system 100 that may be illustrated as a single component may alternatively be implemented as multiple components. Each of the multiple devices and/or components may be directly coupled via wired or wireless communication and/or remotely coupled via one or more networks. Also, one or more devices or components that may be illustrated in FIG. 1 may alternatively be implemented as part of another device or component not shown in FIG. 1.

Further, certain operations, techniques, features, and/or functions may have been described herein as being performed by specific components, devices, and/or modules in FIG. 1. In other examples, such operations, techniques, features, and/or functions may be performed by different components, devices, or modules. Accordingly, some operations, techniques, features, and/or functions that may have been described herein as being attributed to one or more components, devices, or modules in FIG. 1 may, in other examples, be attributed to other components, devices, and/or modules, even if not specifically described herein in such a manner.

Through techniques in accordance with one or more aspects of the present disclosure, such as by providing guidance to call center agents as to how to authenticate users, system 100 may more reliably and accurately authenticate users. By more reliably and accurately authenticating users, system 100 may limit fraud and more effectively safeguard data and financial assets. Improving authentication procedures will, for example, limit unauthorized access to accounts, and thereby prevent fraud. Therefore, aspects of this disclosure may improve the function of system 100 because providing guidance to call center agents in the manner described herein may have the effect of causing system 100 to limit fraud and more effectively safeguard assets.

Figure 2:
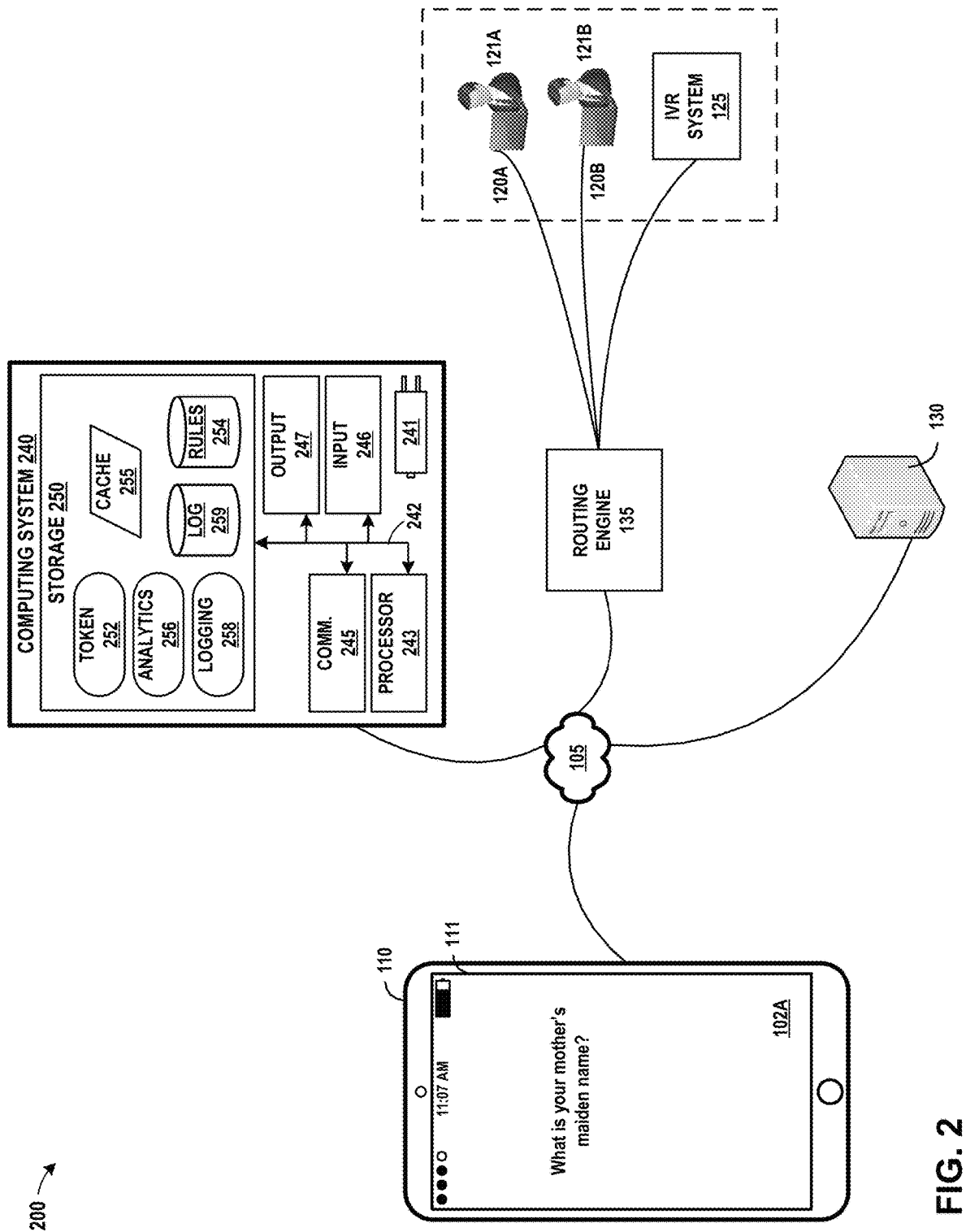
FIG. 2 is a block diagram illustrating an example system that manages procedures for authenticating a user over the course of multiple sessions, in accordance with one or more aspects of the present disclosure.

FIG. 2 is a block diagram illustrating an example system that manages procedures for authenticating a user over the course of multiple sessions, in accordance with one or more aspects of the present disclosure. System 200 of FIG. 2 may be described as an example or alternative implementation of system 100 of FIG. 1. One or more aspects of FIG. 2 may be described herein within the context of FIG. 1.

In the example of FIG. 2, system 200 includes many of the same systems, devices, and/or components shown in FIG. 1, and each may correspond to the system, device, and/or component having the same reference numeral used in FIG. 1. In FIG. 2, computing system 240 may correspond to a system that combines, includes, and/or implements aspects of the functionality of computing system 140 and data store 159 of FIG. 1. Although computing system 240 and agent workstations 120 are shown as separate systems in FIG. 2, aspects of computing system 240 may, in other examples, be integrated into agent workstations 120. Also, for ease of illustration, one (or a small number) of each of the systems, devices, and/or components illustrated in FIG. 2 are shown, although techniques in accordance with one or more aspects of the present disclosure may be performed with many more of such systems.

Network 105 may be the internet, or may include or represent any public or private communications network or other network. For instance, network 105 may be a cellular, Wi-Fi®, ZigBee, Bluetooth, Near-Field Communication (NFC), satellite, enterprise, service provider, and/or other type of network enabling transfer of transmitting data between computing systems, servers, and computing devices. One or more of client devices, server devices, or other devices may transmit and receive data, commands, control signals, and/or other information across network 105 using any suitable communication techniques. Network 105 may include one or more network hubs, network switches, network routers, satellite dishes, or any other network equipment. Such devices or components may be operatively inter-coupled, thereby providing for the exchange of information between computers, devices, or other components (e.g., between one or more client devices or systems and one or more server devices or systems). Each of the devices or systems illustrated in FIG. 2 may be operatively coupled to network 105 using one or more network links. The links coupling such devices or systems to network 105 may be Ethernet, Asynchronous Transfer Mode (ATM) or other types of network connections, and such connections may be wireless and/or wired connections. One or more of the devices or systems illustrated in FIG. 2 or otherwise on network 105 may be in a remote location relative to one or more other illustrated devices or systems.

Computing system 240 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, computing system 240 represents a cloud computing system, server farm, and/or server cluster (or portion thereof) that provides services to client devices and other devices or systems. In other examples, computing system 240 may represent or be implemented through one or more virtualized compute instances (e.g., virtual machines, containers) of a data center, cloud computing system, server farm, and/or server cluster.

In the example of FIG. 2, computing system 240 may include power source 241, one or more processors 243, one or more communication units 245, one or more input devices 246, one or more output devices 247, and one or more storage devices 250. Storage devices 250 may include token management module 252, fraud analytics module 256, logging module 258, token cache 255, rules data store 254, and log data store 259. One or more of the devices, modules, storage areas, or other components of computing system 240 may be interconnected to enable inter-component communications (physically, communicatively, and/or operatively). In some examples, such connectivity may be provided by through communication channels (e.g., communication channels 242), a system bus, a network connection, an inter-process communication data structure, or any other method for communicating data.

Power source 241 may provide power to one or more components of computing system 240. Power source 241 may receive power from the primary alternating current (AC) power supply in a building, home, or other location. In other examples, power source 241 may be a battery or a device that supplies direct current (DC). In still further examples, computing system 240 and/or power source 241 may receive power from another source. One or more of the devices or components illustrated within computing system 240 may be connected to power source 241, and/or may receive power from power source 241. Power source 241 may have intelligent power management or consumption capabilities, and such features may be controlled, accessed, or adjusted by one or more modules of computing system 240 and/or by one or more processors 243 to intelligently consume, allocate, supply, or otherwise manage power.

One or more processors 243 of computing system 240 may implement functionality and/or execute instructions associated with computing system 240 or associated with one or more modules illustrated herein and/or described below. One or more processors 243 may be, may be part of, and/or may include processing circuitry that performs operations in accordance with one or more aspects of the present disclosure. Examples of processors 243 include microprocessors, application processors, display controllers, auxiliary processors, one or more sensor hubs, and any other hardware configured to function as a processor, a processing unit, or a processing device. Central monitoring system 210 may use one or more processors 243 to perform operations in accordance with one or more aspects of the present disclosure using software, hardware, firmware, or a mixture of hardware, software, and firmware residing in and/or executing at computing system 240.

One or more communication units 245 of computing system 240 may communicate with devices external to computing system 240 by transmitting and/or receiving data, and may operate, in some respects, as both an input device and an output device. In some examples, communication unit 245 may communicate with other devices over a network. In other examples, communication units 245 may send and/or receive radio signals on a radio network such as a cellular radio network. In other examples, communication units 245 of computing system 240 may transmit and/or receive satellite signals on a satellite network such as a Global Positioning System (GPS) network. Examples of communication units 245 include a network interface card (e.g. such as an Ethernet card), an optical transceiver, a radio frequency transceiver, a GPS receiver, or any other type of device that can send and/or receive information. Other examples of communication units 245 may include devices capable of communicating over Bluetooth®, GPS, NFC, ZigBee, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth, NFC, or other technologies or protocols.

One or more input devices 246 may represent any input devices of computing system 240 not otherwise separately described herein. One or more input devices 246 may generate, receive, and/or process input from any type of device capable of detecting input from a human or machine. For example, one or more input devices 246 may generate, receive, and/or process input in the form of electrical, physical, audio, image, and/or visual input (e.g., peripheral device, keyboard, microphone, camera).

One or more output devices 247 may represent any output devices of computing system 240 not otherwise separately described herein. One or more output devices 247 may generate, receive, and/or process input from any type of device capable of detecting input from a human or machine. For example, one or more output devices 247 may generate, receive, and/or process output in the form of electrical and/or physical output (e.g., peripheral device, actuator).

One or more storage devices 250 within computing system 240 may store information for processing during operation of computing system 240. Storage devices 250 may store program instructions and/or data associated with one or more of the modules described in accordance with one or more aspects of this disclosure. One or more processors 243 and one or more storage devices 250 may provide an operating environment or platform for such modules, which may be implemented as software, but may in some examples include any combination of hardware, firmware, and software. One or more processors 243 may execute instructions and one or more storage devices 250 may store instructions and/or data of one or more modules. The combination of processors 243 and storage devices 250 may retrieve, store, and/or execute the instructions and/or data of one or more applications, modules, or software. Processors 243 and/or storage devices 250 may also be operably coupled to one or more other software and/or hardware components, including, but not limited to, one or more of the components of computing system 240 and/or one or more devices or systems illustrated as being connected to computing system 240.

Token management module 252 may perform functions relating to identifying appropriate procedures for authenticating a user, including managing authentication tokens and determining which, and in what order, authentication challenges should be presented to a user of mobile phone 110. Token management module 252 may generate instructions for authenticating a user, and cause computing system 240 to output the instructions over network 105 to agent workstations 120, to a workstation at a bank branch, to interactive voice response system 125, to an automated teller machine, or to another system. Token management module 252 may monitor, in near or seemingly-near real time, a voice conversation between a user of mobile phone 110 and one or more agents 121, and identify information, such as authentication tokens, that are communicated during the voice conversation. Token management module 252 may cause logging module 258 to update log data stores 259 based on information monitored during a voice conversation. Token management module 252 may generate user interfaces, such as those illustrated in FIG. 3A, FIG. 3B, FIG. 3C, FIG. 4A, and FIG. 4B.

Further, token management module 252 may receive information from and output information to one or more other modules, and may otherwise interact with and/or operate in conjunction with one or more other modules of computing system 240. For example, token management module 252 may enable an administrator to create initial or new authentication tokens, and manually configure or program rules based on updated policies or fraud analytics. Token management module 252 may determine or define how tokens relate to each other, in terms of a rule or other relation with other rules stored in rules data store 254. For example, some authentication tokens might have an on/off state, such that when in the off state, they are not used. A rule may be defined that determines when, or under what conditions, such tokens may be transitioned from an on state to an off state, or vice-versa. Although token management module 252 may be described in connection with FIG. 2 as primarily performing operations relating to managing authentication tokens, token management module 252 may alternatively, or in addition, perform other operations, including prompting a user for an authentication token or causing a user to be transferred to an IVR system for authentication.

Token cache 255 may be used to store information derived from monitoring interactions involving an account, such as voice conversations between a user of mobile phone 110 and one or more agent workstations 120. Token cache 255 may be created or updated by token management module 252 when authentication tokens are being used, managed, or modified. Token cache 255 may be used to store tokens during the authentication process, and may be used to track the state of the authentication process. For example, some authentication procedures may require a user to respond correctly to multiple authentication challenges, and token cache 255 may track which challenges have been completed and which challenges remain.

Fraud analytics module 256 may perform functions relating to analyzing information sources to generate and/or update rules stored in rules data store 254 or configuration information used to generate or update rules stored in rules data store 254. Fraud analytics module 256 may evaluate information in log data store 259 to generate and/or update authentication token configuration information that may be used to generate new rules relating to how authentication tokens are used. Fraud analytics module 256 may evaluate information from external sources or administrator input to determine updates to rules relating to how authentication tokens are used. For instance, if one type of authentication token is the last four digits of a social security number, and a security breach has resulted in a widespread distribution of social security numbers, then a rule, configured by an administrator or otherwise, may prohibit any use of social security numbers as authentication tokens, or reduce the weight given to such authentication tokens. In another example, analytics component 156 may determine that a particular account is experiencing numerous authentication attempts during a short period of time (i.e., a high velocity of calls to a call center). If some or all of such calls involve a user seeking to authenticate using a particular authentication token (e.g., mother's maiden name), fraud analytics module 256 may, as a result, determine that that authentication token should not be used for any type of authentication. Fraud analytics module 256 may further determine that additional steps should be taken to secure the account. In such examples, fraud analytics module 256 may configure a rule disabling the use of a one or more authentication tokens for the affected account, and take other steps to secure the account. Fraud analytics module 256 may also configure procedures involving other authentication tokens, such as a zip code, voiceprints, thumbprint, or other biometric data, passwords, pin numbers, or any other information that may be used to authenticate a user to access an account.

Fraud analytics module 256 may also determine, for situations involving more than one authentication token, in what order the authentication tokens should be presented. In some examples, the authentication tokens are presented in a different order each time, or in a random order. In other examples, artificial intelligence and/or machine learning algorithms might be used to determine an optimal order of authentication tokens, or an optimal number of authentication tokens, or an optimal type of authentication tokens.

Further, fraud analytics module 256 may define rules that determine different tiers or levels of authentication. For instance, to authenticate a user to access information relating to a personal bank account, one set of rules may define what is required to properly authenticate a user. However, to authenticate a user to access a brokerage or other account, another set of rules may define what is required, and may involve additional authentication challenges not required of other rules. In general, fraud analytics module 256 may drive rule configuration based on fraud activity derived from log data store 259, from fraud service analytics, and/or from other sources.

Logging module 258 may perform functions relating to storing information about interactions associated with an account over a wide variety of channels, whether such interactions involve mobile, web, IVR, voice calls with an agent, physical retail visits, or other channels. Logging module 258 may log data collected during or after calls or other interactions, and in some examples, may move data in near or seemingly-near real time to data store 259. In some examples, logging module 258 may store, in log data store 259, information about authentication tokens used in various sessions, and in what order such tokens were used during such sessions. Logging module 258 may store, in log data store 259, information about the frequency of interactions, what devices were used for such interactions, and any other available information about the interaction (e.g., IP address of a device used, geolocation information, location of bank branch visited, etc.). Logging module 258 may also store, in log data store 259, transcripts or recordings of voice conversations that take place between a user of mobile phone 110 and one or more agents 121, or video clips of physical interactions at a retail location.

Rules data store 254 may represent any suitable data structure or storage medium for storing information related to rules for how authentication tokens are to be used, applied, managed, and/or administered. The information stored in rules data store 254 may be searchable and/or categorized such that one or more modules within computing system 240 may provide an input requesting information from rules data store 254, and in response to the input, receive information stored within rules data store 254. Rules data store 254 may be primarily maintained by fraud analytics module 256. Rules data store 254 may store information that can be used to generate a set of instructions for authenticating a user, whether that user is a visitor to physical location (e.g., a bank branch), a user browsing to a web site and seeking access to an account, or a caller into an organization's call center with inquiries about an account held at the organization. Rules data store 254 may provide other modules with access to the data stored within rules data store 254, and/or may analyze the data stored within rules data store 254 and output such information on behalf of other modules of computing system 240.

Log data store 259 may represent any suitable data structure or storage medium for storing information related to information logged by logging module 258. Accordingly, logging module 258 may store information about call center interactions, interactions with a web site, and/or interactions with a mobile application server. Logging module 258 may also store audio, video, or other information derived from retail visits or voice call sessions between a user (e.g., a user of mobile phone 110) and an agent of an organization (e.g., agents 121). The information stored in log data store 259 may be searchable and/or categorized such that one or more modules within computing system 240 may provide an input requesting information about a particular account from log data store 259, and in response to the input, receive information stored within log data store 259, which may include information describing historical interactions with the account. Such information may include the frequency of the interactions, the type of interactions, the authentication tokens used, divulged, or otherwise exchanged, as well as information about information that a user seeking authentication to the account did not know. Log data store 259 may be primarily maintained by logging module 258.

Modules illustrated in FIG. 2 (e.g., token management module 252, fraud analytics module 256, and logging module 258) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

FIG. 2 illustrates one example implementation of system 200. Other example or alternative implementations of system 200 may be appropriate in other instances. Such implementations may include a subset of the devices and/or components included in the example of FIG. 2 and/or may include additional devices and/or components not shown in FIG. 2. Accordingly, although one or more implementations of system 200 of FIG. 2 are described, system 200 may be implemented in a number of other ways.

For instance, one or more devices of system 200 that are illustrated as separate devices may be implemented as a single device; one or more components of system 200 that are illustrated as separate components may be implemented as a single component. Also, in some examples, one or more devices of system 200 that are illustrated as a single device may be implemented as multiple devices; one or more components of system 200 that are illustrated as a single component may be implemented as multiple components. Each of the multiple devices and/or components may be directly coupled via wired or wireless communication and/or remotely coupled via one or more networks. Also, one or more devices or components illustrated in FIG. 2 may also be implemented as part of another device or component not shown in FIG. 2. In this and other ways, some of the functions described herein may be performed via distributed processing by two or more devices.

Further, certain operations, techniques, features, and/or functions are described herein as being performed by specific components, devices, and/or modules in FIG. 2. In other examples, such operations, techniques, features, and/or functions may be performed by different components, devices, or modules. Accordingly, some operations, techniques, features, and/or functions described herein as being attributed to one or more components, devices, or modules in FIG. 2 may, in other examples, be attributed to other components, devices, and/or modules, even if not specifically described herein in such a manner.

Figure 3B:
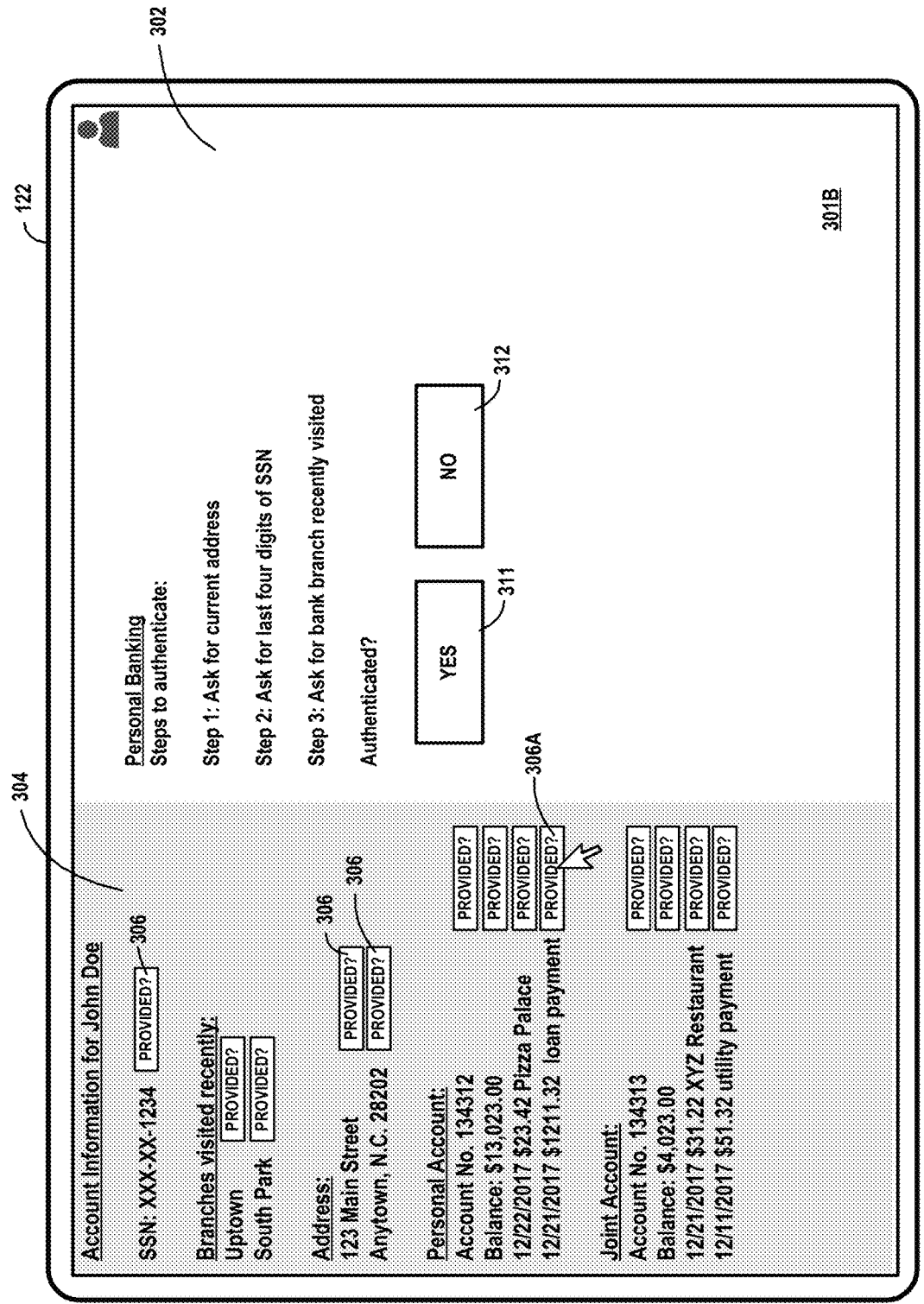
Figure 3C:
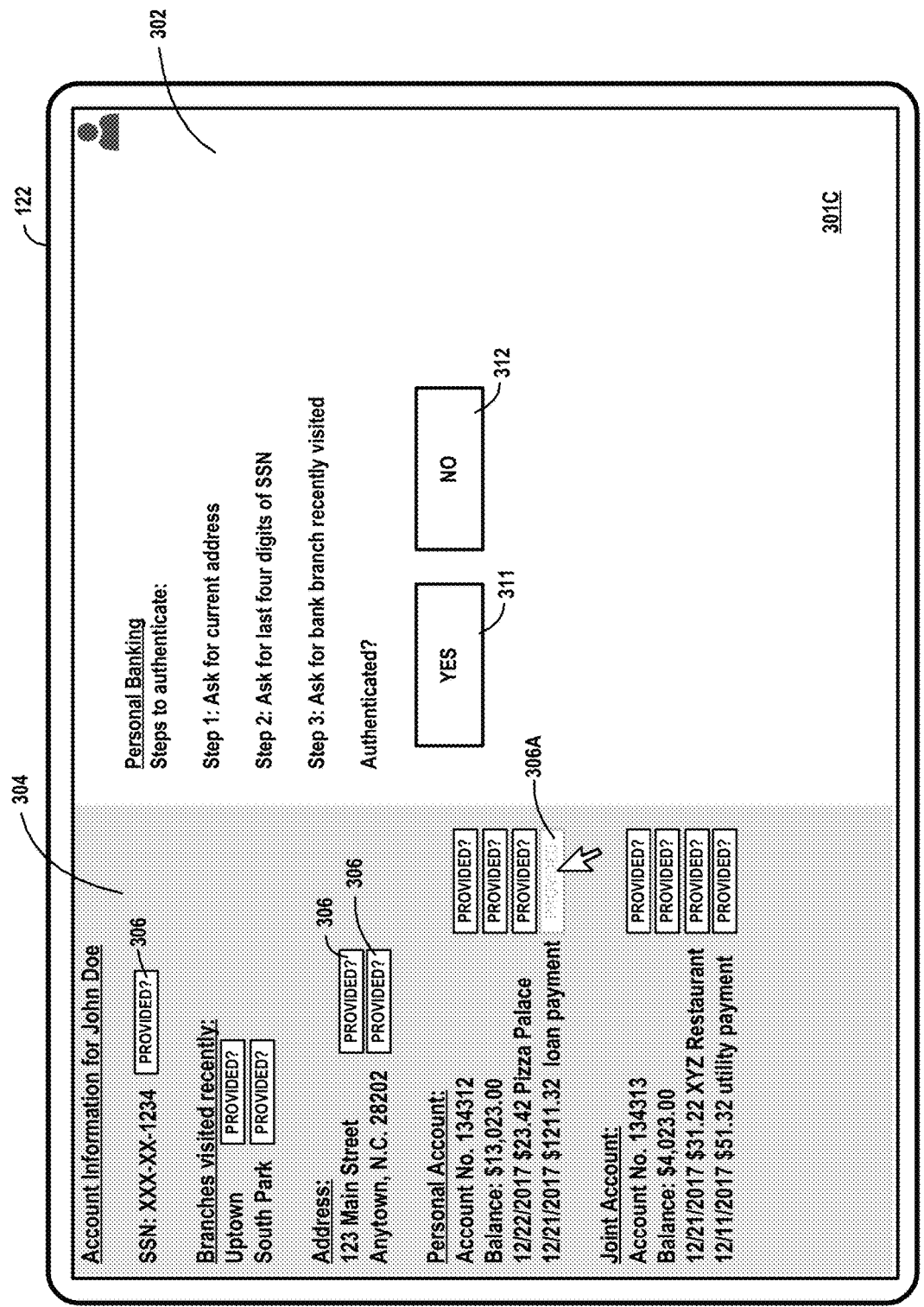

FIG. 3A, FIG. 3B, and FIG. 3C are conceptual diagrams illustrating example user interfaces presented by an example agent workstation, in accordance with one or more aspects of the present disclosure. User interface 301A, as illustrated in FIG. 3A, may correspond to a user interface presented by one or more of agent workstations 120 of FIG. 1 and/or FIG. 2, and may present instructions or other information relating to authenticating a user, such as a user of mobile phone 110 of FIG. 1 and/or FIG. 2. Although the user interfaces illustrated in FIG. 3A and FIG. 3B are shown as graphical user interfaces, other types of interfaces may be presented in other examples, including a text-based user interface, a console or command-based user interface, a voice prompt user interface, or any other appropriate user interface. One or more aspects of the user interfaces illustrated in FIG. 3A and FIG. 3B may be described herein within the context of system 200 of FIG. 2.

FIG. 3A is an example user interface illustrating user account information and steps to authenticate the user. User interface 301A may be presented at a display device (e.g., display 122) associated with agent workstation 120A of FIG. 1 or FIG. 2. For instance, with reference to an example that can be described in the context of FIG. 2, routing engine 135 routes a call, initiated by mobile phone 110, to agent workstation 120A, and thereby enables agent 121A and a user of mobile phone 110 to engage in a voice conversation. Agent 121A determines, based on a voice conversation with the user of mobile phone 110, that the user of mobile phone 110 is calling about an account owned by John Doe. Agent workstation 120A detects input that it determines corresponds to information identifying the account. Agent workstation 120A outputs a signal over network 105. Communication unit 245 of computing system 240 detects a signal and outputs an indication of the signal to token management module 252. Token management module 252 determines that the signal corresponds to a request for instructions for authenticating a user to access John Doe's account. Token management module 252 accesses rules data store 254 and generates instructions. Token management module 252 causes communication unit 245 to output a signal over network 105. Agent workstation 120A detects a signal over network 105 and determines that the signal includes information sufficient to present a user interface. Agent workstation 120A presents user interface 301A at display 122 as illustrated in FIG. 3A.

In FIG. 3A, user interface 301A includes agent region 302 and account information region 304. Agent region 302 presents instructions for authenticating John Doe. In the example of FIG. 3A, agent region 302 includes a "Step 1" for authenticating John Doe. Account information region 304 presents information about John Doe's account, including the location of bank branches visited recently, as well as account numbers and recent transactions. Agent 121A may use the information in account information region 304 to verify the answer to the authentication challenge question presented in user interface 301A.

FIG. 3B is an example user interface illustrating additional steps for authenticating the user. User interface 301B may be presented at display 122 after an agent has completed each of the steps to authenticate the user. For instance, with reference to FIG. 2 and FIG. 3A, agent workstation 120A detects input that agent workstation 120A determines corresponds to a selection of "next step" button 308. Agent workstation 120A outputs a signal over network 105. Communication unit 245 of computing system 240 detects a signal over network 105 and outputs an indication of the signal to token management module 252. Token management module 252 determines that the signal corresponds to a request for the next step in authenticating the user. Token management module 252 determines the next step and causes communication unit 245 to output a signal over network 105. Agent workstation 120A detects a signal over network 105, and agent workstation 120A determines that the signal includes information about additional authentication steps. Agent workstation 120A and computing system 240 may further communicate, and agent workstation 120A may make requests for further steps in authenticating the user. Agent workstation 120A detects one or more signals over network 105 and determines that the signal includes information sufficient to present one or more user interfaces. Agent workstation 120A presents, for example, user interface 301B as illustrated in FIG. 3B.

In FIG. 3B, user interface 301B illustrates the remaining steps to authenticate the user of mobile phone 110. User interface 301B also prompts the agent for his or her assessment of whether the user correctly answered each of the authentication challenges presented. Agent workstation 120A may detect input that it determines corresponds to selection of "yes" button 311 if agent 121A has determined that the user of mobile phone 110 is authenticated. Agent workstation 120A may detect input that it determines corresponds to selection of "no" button 312 if agent 121A determines that the user of mobile phone 110 did not sufficiently answer the authentication challenges.

FIG. 3C is an example user interface that has been updated to reflect information that an agent has provided to a caller. User interface 301C may be presented at display 122 after an agent has selected button 306A in FIG. 3B. For instance, with reference to FIG. 2 and FIG. 3B, agent workstation 120A detects input that it determines corresponds to an interaction with button 306A. Agent workstation 120A outputs a signal over network 105. Communication unit 245 of computing system 240 detects a signal and outputs to token management module 252 an indication of the signal. Token management module 252 determines that the signal corresponds to an indication that agent 121A, while engaging in a conversation with a user of mobile phone 110, divulged to that user information relating to the Dec. 21, 2017 loan payment on John Doe's personal account (shown within account information region 304 of FIG. 3B, and adjacent to button 306A). Token management module 252 updates log data store 259 and token cache 255 to reflect the indication. Token management module 252 causes communication unit 245 to output a signal over network 105. Agent workstation 120A detects a signal over network 105 and determines that the signal includes information sufficient to update user interface 301B. Agent workstation 120A presents user interface 301C as illustrated in FIG. 3C.

In FIG. 3C, the appearance of button 306A has been modified (e.g., grayed-out) to reflect that the item of information corresponding to button 306A was provided to the user. Agent 121A may, by selecting each button 306, efficiently and quickly mark each item of information that was intentionally or inadvertently disclosed during the conversation. Further, fraud analytics module 256 may thereafter determine that personal account information for John Doe, or any items divulged by an agent, should not be used to authenticate the user. Fraud analytics module 256 may update rules data store 254 to reflect that determination, and authentication instructions during the current or later calls may be adjusted accordingly.

For instance, in one example, agent 121A determines, based on authentication challenges presented to a user of mobile phone 110, that the user of mobile phone 110 is authenticated to access information about John Doe's account. During the call, perhaps in response to a request for information by the user of mobile phone 110, agent 121A divulges information about recent transactions posted in John Doe's personal account. Agent 121A selects a button 306 associated with each transaction or other item of information for which information has been provided to the user of mobile phone 110 during the call (e.g., see buttons 306 in FIG. 3B and FIG. 3C). In response to one or more selections of buttons 306, fraud analytics module updates rules data store 254 to create a rule ensuring that none of the items of information provided by the user during the call (i.e., the information about recent transactions posted in John Doe's account) should be used for authentication tokens during a later call in which a caller seeks authentication to access John Doe's account. Such a rule may apply indefinitely once information is disclosed by the agent 121A, or the rule may apply for a defined time period.

In some examples, token management module 252 of computing system 240 may monitor, in near or seemingly-near real time, the voice conversation between agent 121A and the user of mobile phone 110. In such an example, token management module 252 may use voice recognition analysis to identify any information that may have been mentioned, either by the agent or the user of mobile phone 110. Token management module 252 may, upon detecting that an agent mentioned an item of information, update log data store 259 and/or token cache 255 accordingly. Token management module 252 may also cause an updated user interface to be presented at agent workstation 120A, graying out each button 306 corresponding to information that has been recognized by token management module 252 during the voice conversation. In this way, user interface 301C may appear to be automatically updated (e.g., graying-out one or more buttons 306) during the conversation to reflect information mentioned in the conversation.

FIG. 4A and FIG. 4B are conceptual diagrams illustrating example user interfaces presented by an example agent workstation, in accordance with one or more aspects of the present disclosure. User interface 401A, as illustrated in FIG. 4A, may correspond to a user interface presented by one or more of agent workstations 120 of FIG. 1 and/or FIG. 2, and may present display elements relating to authenticating a user, such as a user of mobile phone 110 of FIG. 1 and/or FIG. 2. Like user interfaces 301 of FIG. 3A, FIG. 3B, and FIG. 3C, user interface 401A is presented within display 122 in FIG. 4A, which may be a display associated with an agent workstation, such as agent workstation 120A or agent workstation 120B. And as with earlier user interfaces illustrated in the Figures, although the user interfaces illustrated in FIG. 4A and FIG. 4B are shown as graphical user interfaces, other types of interfaces may be presented in other examples, including a text-based user interface, a console or command-based user interface, a voice prompt user interface, or any other appropriate user interface. One or more aspects of the user interfaces illustrated in FIG. 4A and FIG. 4B may be described herein within the context of system 200 of FIG. 2.

In FIG. 4A, user interface 401A may present options for authenticating a user. For instance, with reference to an example that can be described in the context of FIG. 2, routing engine 135 routes a call, initiated by mobile phone 110, to agent workstation 120A, and thereby enables agent 121A and a user of mobile phone 110 to engage in a voice conversation. As in FIG. 3A, agent 121A determines, based on a voice conversation with the user of mobile phone 110, that the user of mobile phone 110 is calling about an account held by John Doe. Token management module 252 receives, from agent workstation 120A over network 105, an indication of a request to authenticate the user of mobile phone 110. Token management module 252 causes communication unit 245 to output a signal over network 105. Agent workstation 120A detects a signal over network 105 and determines that the signal includes information sufficient to present a user interface. Agent workstation 120A presents user interface 401A at display 122A as illustrated in FIG. 4A.

User interface 401A includes button 411. In some examples, rather than a set of instructions, as presented by user interface 301A of FIG. 3A, 401A simply presents "authenticate user" button 411, which, when selected, initiates an authentication procedure that may require little or no involvement by the agent.

FIG. 4B is an example user interface presenting the results of an authentication procedure initiated by selecting button 411 of FIG. 4A. For instance, with reference to FIG. 2 and FIG. 4A, agent workstation 120A detects input that agent workstation 120A determines corresponds to selection button 411 of FIG. 3A. Agent workstation 120A outputs a signal over network 105. Communication unit 245 of computing system 240 detects a signal that token management module 252 determines corresponds to a request to authenticate a user of mobile phone 110. Token management module 252 accesses rules data store 254 and determines rules for authenticating a user of mobile phone 110. Token management module 252 outputs a signal over network 105 that routing engine 135 determines corresponds to a request to convert the current call to a voice session between mobile phone 110 and interactive voice response system 125. Routing engine 135 performs the conversation, enabling the user of mobile phone 110 and interactive voice response system 125 to engage in audio communication. Token management module 252 communicates instructions to interactive voice response system 125, based on the rules, for authenticating a user of mobile phone 110. Interactive voice response system 125 issues authentication challenges to the user of mobile phone 110 during the voice session, pursuant to the instructions. Interactive voice response system 125 stores the responses, and based on the responses, interactive voice response system 125 may issue additional authentication challenges. Interactive voice response system 125 eventually makes a determination about whether the user of mobile phone 110 is authenticated.

Interactive voice response system 125 outputs, over network 105, a signal to computing system 240 that token management module 252 determines corresponds to the results of the authentication challenges presented by interactive voice response system 125. Interactive voice response system 125 also outputs a signal to routing engine 135. Routing engine 135 determines that the signal corresponds to a request to convert the voice session between mobile phone 110 and interactive voice response system 125 back to a voice session between mobile phone 110 and 120A. Routing engine 135 performs the conversion so that mobile phone 110 and agent workstation 120A are in a voice communication session. Token management module 252 of computing system 240 detects that the voice conversation between mobile phone 110 and agent workstation 120A has resumed, and in response, outputs a signal over network 105. Agent workstation 120A detects a signal and determines that the signal includes information sufficient to present a user interface. Agent workstation 120A presents user interface 401B as illustrated in FIG. 4B.

In FIG. 4B, user interface 401B indicates that the user was successfully authenticated by interactive voice response system 125. In the example of FIG. 4B, the agent may assume that the user of mobile phone 110 has been authenticated, and may respond to that user's customer service inquiries, provide requested information, and/or perform other tasks. If the agent is employed by a bank, for example, user interface 401B may include various buttons 412 (or other user interface elements), as shown in FIG. 4B, that may be used to perform common functions relating to Personal Banking. In some examples, agent workstation 120A may, based on input from the agent, cause routing engine 135 to transfer the voice communications session involving mobile phone 110 to another agent, such as agent 121B operating agent workstation 120B.

Figure 5:
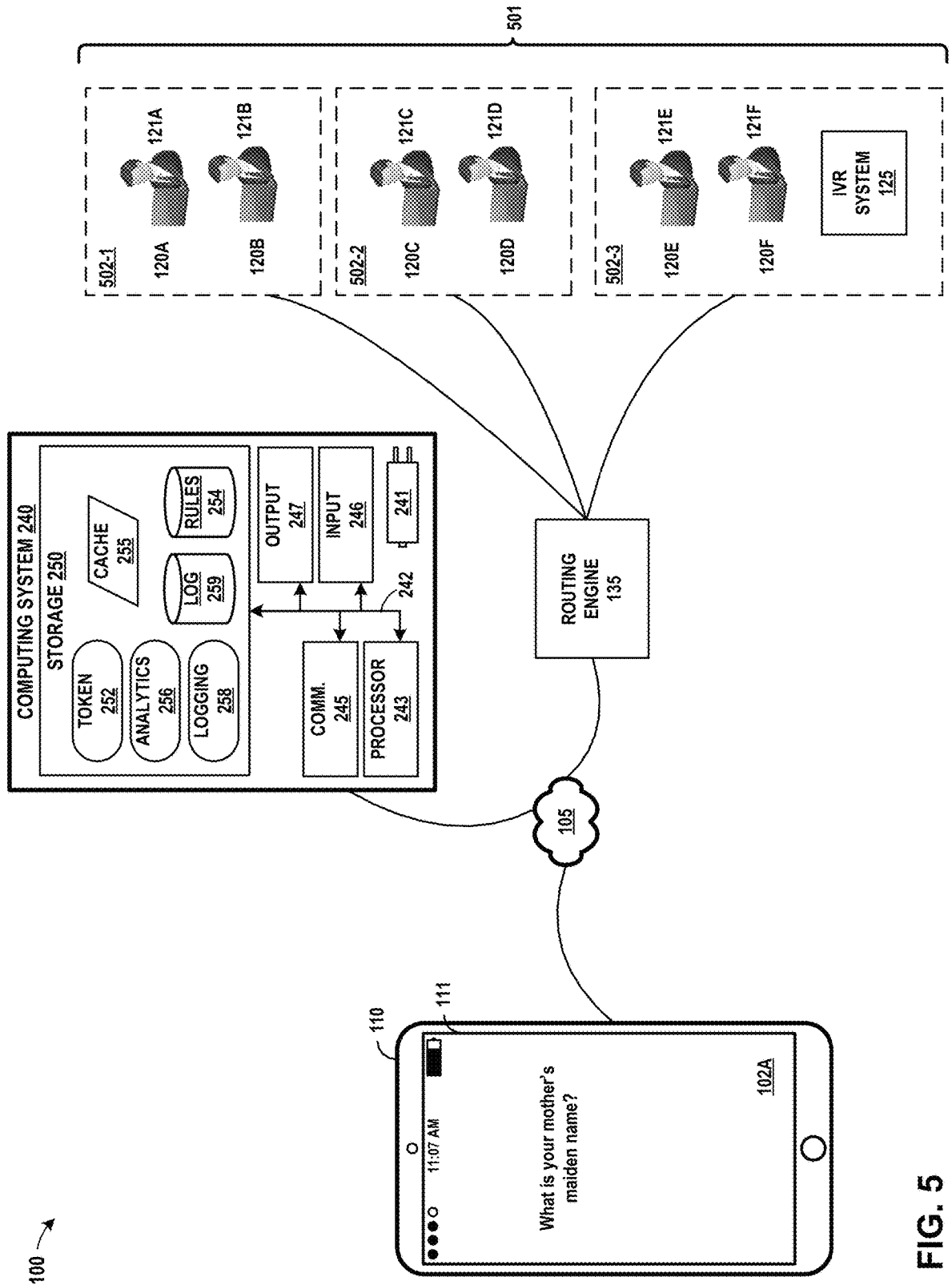
FIG. 5 is a conceptual diagram illustrating an example system that manages procedures for authenticating a user across multiple lines of business, in accordance with one or more aspects of the present disclosure.

FIG. 5 is a conceptual diagram illustrating an example system that manages procedures for authenticating a user across multiple lines of business, in accordance with one or more aspects of the present disclosure. For instance, the example of FIG. 5 illustrates a number of agents 121, each operating an agent workstation, for multiple sub-organizations 502 within a larger organization 501. In FIG. 5, organization 501 includes sub-organization 502-1, sub-organization 502-2, and sub-organization 502-3. Each of sub-organizations 502 may include numerous agent workstations 120, but for convenience, only two agent workstations 120 are shown within each of sub-organizations 502.

In one example, organization 501 corresponds to a bank or financial institution. Each of sub-organizations 502 may, in such an example, correspond to a line of business for that bank (e.g., personal banking, mortgage, lending, brokerage, etc.). Computing system 240 may administer authentication procedures for each line of business, and computing system 240 may, in some examples, adjust authentication procedures for each line of business based on the level of authentication required for each such line of business. For instance, one line of business (e.g., brokerage) may require a higher level of authentication than another line of business (e.g., mortgage).

Computing system 240 may, in some examples, require additional authentication when a caller authenticated to speak to an agent in one line of business is transferred to an agent for another line of business. For instance, in the example of FIG. 5, a voice communications session may be established between mobile phone 110 and agent workstation 120A. During the session, agent 121A, who may be an agent for the mortgage line of business, may have authenticated the user to access information about a mortgage account. Agent 121A may have authenticated the user of mobile phone 110 by presenting authentication challenges to the user, or in other examples, the user may have been authenticated through the use of an IVR in the manner described in connection with FIG. 4A and FIG. 4B. At some point during the conversation between the user of mobile phone 110 and agent 121A, agent workstation 120A detects input and communicates information about the input to computing system 240 over network 105. Token management module 252 of computing system 240 determines that the input corresponds to a request to transfer the call to agent workstation 120C. Agent workstation 120C is operated by agent 121C, who may be an agent for the personal banking line of business. Computing system 240 outputs a transfer request to routing engine 135. Routing engine 135 transfers the call to agent 121C, so that a voice communication session is established between mobile phone 110 and agent workstation 120C. Token management module 252 of computing system 240 determines that while the user of mobile phone 110 is authenticated to interact with an agent for the mortgage line of business (e.g., agent 121A), the user is not sufficiently authenticated to interact with agent 121C. Accordingly, computing system 240 communicates with agent workstation 120C, and causes a user interface to be presented at agent workstation 120C, notifying agent 121C that additional authentication is required. Agent workstation 120C may further authenticate the user in response to input from agent 121C. In some examples, the user of mobile phone 110 may be further authenticated by agent 121C presenting the user with additional authentication challenges, through the use of an IVR, or through another method.

In the example just described, computing system 240 provides authentication and token management services across multiple sub-organizations or lines of business within a larger organization. By providing services across multiple sub-organizations, broader authentication token use visibility may be attained, which may lead to more consistent and reliable use and management of authentication tokens across a large organization. Further, some authentication procedures or rules may apply to each line of business, and other authentication procedures or rules may apply to only a subset of all lines of business. Accordingly, computing system 240 may maintain a first set of rules applying to a plurality of lines of business within the organization, and computing system 240 may maintain a second set of rules applying to each of the lines of business within the organization.

Further, in some examples, computing system 240 may alternatively, or in addition, be implemented as a service available to third parties. In such an example, computing system 240 may provide authentication token management services third party organizations and/or to sub-organizations within such third party organizations.

Figure 6:
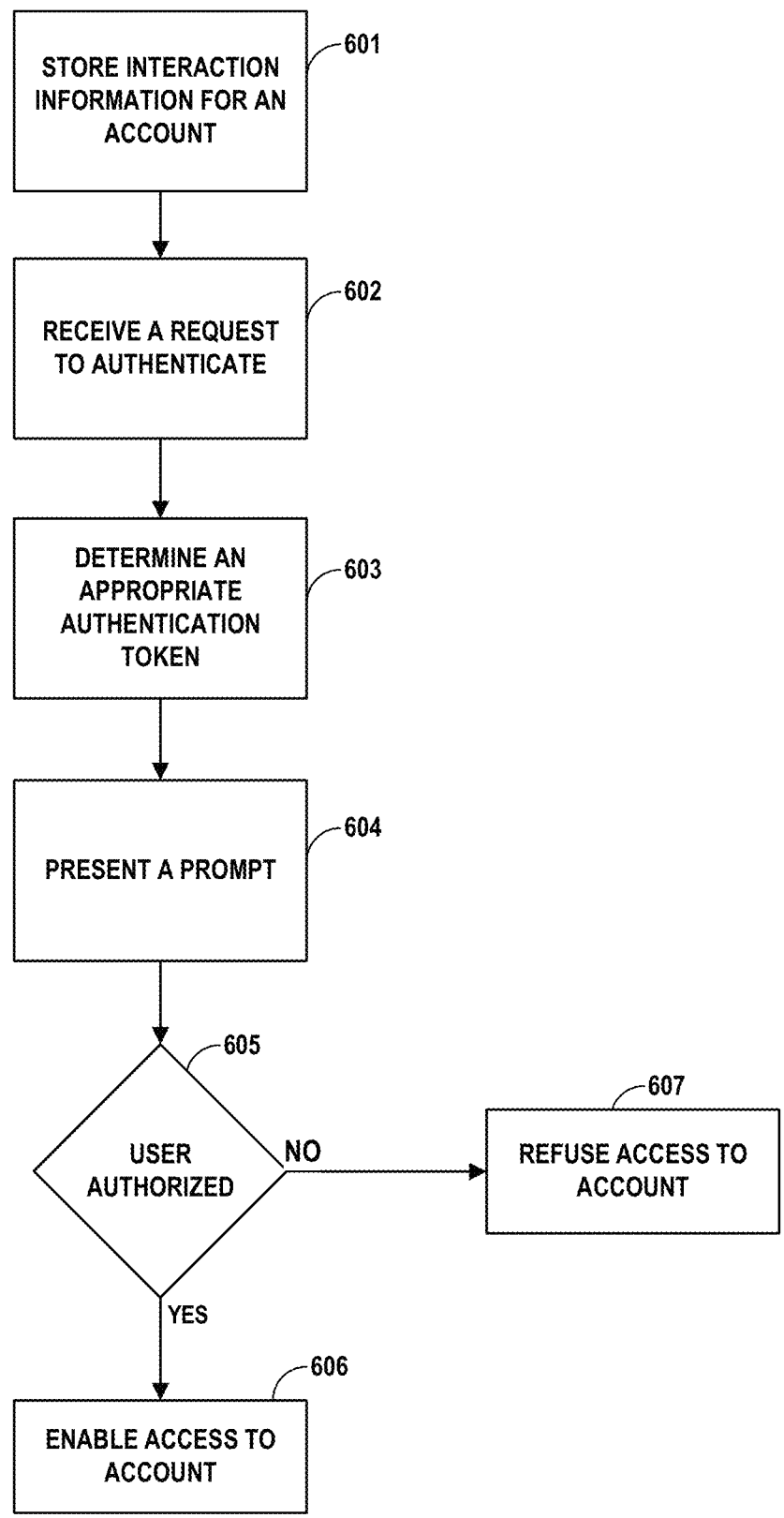
FIG. 6 is a flow diagram illustrating operations performed by an example computing system in accordance with one or more aspects of the present disclosure.

FIG. 6 is a flow diagram illustrating operations performed by an example computing system in accordance with one or more aspects of the present disclosure. FIG. 6 is described below within the context of computing system 240 of FIG. 2. In other examples, operations described in FIG. 6 may be performed by one or more other components, modules, systems, or devices. Further, in other examples, operations described in connection with FIG. 6 may be merged, performed in a difference sequence, or omitted.

In the example of FIG. 6, and in accordance with one or more aspects of the present disclosure, computing system 240 may store interaction information for an account (601). For instance, in some examples, token management module 252 of computing system 240 may detect an ongoing call between a user of mobile phone 110 and agent workstation 120A, operated by agent 121A. Token management module 252 of computing system 240 may also detect input that it determines corresponds to information about the call, including the identity of an account that the user of mobile phone 110 seeks to access. Computing system 240 causes logging module 258 to log information about the call in log data store 259.

Computing system 240 may receive a request to authenticate a user (602). For instance, in some examples, communication unit 245 of computing system 240 may detect a signal over network 105 that token management module 252 determines corresponds to a request to authenticate a user. Token management module 252 may further determine that the signal identifies a specific account that the user of mobile phone 110 seeks to access.

Computing system 240 may determine one or more appropriate authentication tokens to be used when authenticating the user (603). For instance, in some examples, token management module 252 outputs to fraud analytics module 256 a request for instructions about how to authenticate a user to access the specified account. In response to the request, or earlier, fraud analytics module 256 analyzes information stored within log data store 259 and determines procedures for authenticating a user seeking to access the specific account. Token management module 252 receives instructions for authenticating a user from fraud analytics module 256, tailored for the specific account.

Computing system 240 may present a prompt to agent 121A (604). For instance, token management module 252 may cause communication unit 245 to output a signal over network 105. Agent workstation 120A may detect a signal, and in response, present to agent 121A a user interface including instructions for authenticating the user of mobile phone 110 (see, e.g., FIG. 3A).

In another example, computing system 240 may present a prompt to the user of mobile phone 110. For instance, token management module 252 may cause communication unit 245 to output a signal over network 105. Mobile phone 110 may detect a signal that it determines corresponds to an authentication prompt. Mobile phone 110 may detect a response to the prompt, and output a signal over network 105. Token management module 252 may receive an indication of a signal that it determines corresponds to a response, by the user of mobile phone 110, to the prompt.

In another example, computing system 240 may cause interactive voice response system 125 to present a prompt to the user of mobile phone 110. For instance, token management module 252 may cause communication unit 245 to output a signal over network 105. Interactive voice response system 125 may detect a signal that it determines corresponds to a request to authenticate the user of mobile phone 110. In response, interactive voice response system 125 may output a signal network 105 that mobile phone 110 determines corresponds to audio information, from interactive voice response system 125, prompting the user of mobile phone 110 for a response to an authentication prompt.

Computing system 240 may determine whether the user of mobile phone 110 is authenticated (605). For instance, communication unit 245 of computing system 240 may receive a signal over network 105 from mobile phone 110, interactive voice response system 125, and/or agent workstation 120A. Token management module 252 may determine that the signal corresponds to information about whether the user of mobile phone 110 has been authenticated. Computing system 240 may determine that the user of mobile phone 110 has been authenticated (606) or has not been authenticated (607).

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The detailed description set forth above is intended as a description of various configurations and is not intended to represent the only configurations in which the concepts described herein may be practiced. The detailed description includes specific details for the purpose of providing a thorough understanding of the various concepts. However, these concepts may be practiced without these specific details. In some instances, well-known structures and components are shown in block diagram form in the referenced figures in order to avoid obscuring such concepts.

In accordance with one or more aspects of this disclosure, the term "or" may be interrupted as "and/or" where context does not dictate otherwise. Additionally, while phrases such as "one or more" or "at least one" or the like may have been used in some instances but not others; those instances where such language was not used may be interpreted to have such a meaning implied where context does not dictate otherwise.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A computing system comprising processing circuitry and a storage device, wherein the processing circuitry has access to the storage device and is configured to:
   receive, over a network, a request to gain access to an account maintained by an organization for a user;
   select, from a plurality of authentication tokens associated with the account and based on interaction information associated with the account, an authentication token to be used in an authentication procedure in response to the request to gain access, wherein each of the plurality of authentication tokens is information that is expected to be known by the user of the account, wherein the interaction information includes information about prior authentication tokens used during a plurality of interactions associated with the account and information about a frequency of the interactions, and wherein the selected authentication token is different than the prior authentication tokens used during the plurality of interactions;
   present a prompt for the selected authentication token; and
   determine, based on information received in response to presenting the prompt, whether to grant the request to authenticate.

2. The computing system of claim 1, wherein the authentication procedure involves a user seeking to be authenticated, and wherein to present the prompt for the selected authentication token, the processing circuitry is further configured to:
   output, to a computing device operated by the user, a user interface prompting the user for the selected authentication token.

3. The computing system of claim 2, wherein to determine whether to grant the request to authenticate, the processing circuitry is further configured to:
   receive, from the computing device operated by the user, an indication of whether the user is authorized to access the account.

4. The computing system of claim 1, wherein the authentication procedure involves a user seeking to be authenticated, and wherein to present the prompt for the selected authentication token, the processing circuitry is further configured to:
   output, to a computing device operated by an agent of the organization, a user interface enabling the agent to prompt the user for the selected authentication token.

5. The computing system of claim 4, wherein to determine whether to grant the request to authenticate, the processing circuitry is further configured to:
   receive, from the computing device operated by the agent, an indication of whether the user is authorized to access the account, wherein the selected authentication token is not disclosed to either the user or the agent.

6. The computing system of claim 1, wherein the authentication procedure involves a user seeking to be authenticated, and wherein to present the prompt for the selected authentication token, the processing circuitry is further configured to:
   output a signal causing another computing system to output a user interface that includes the prompt, wherein the other computing system outputs the user interface to a computing device operated by the user.

7. The computing system of claim 6, wherein to determine whether to grant the request to authenticate, the processing circuitry is further configured to:
   receive, from the other computing system, an indication of whether the user is authorized to access the account.

8. The computing system of claim 1, wherein the authentication procedure involves a user seeking to be authenticated, and wherein to select the authentication token, the processing circuitry is further configured to:
   maintain a set of rules for identifying authentication tokens to be used to authenticate users; and
   apply the set of rules to select the authentication token to be used to authenticate the user, wherein applying the set of rules limits reuse of the prior authentication tokens.

9. The computing system of claim 8, wherein the processing circuitry is further configured to:
   collect information about external fraud events; and
   wherein to maintain the set of rules, the processing circuitry is further configured to update, based on the information about external fraud events, the set of rules.

10. The computing system of claim 8, wherein to maintain the set of rules, the processing circuitry is further configured to:
    maintain a first set of rules applying to a plurality of lines of business within the organization; and
    maintain a second set of rules applying to each of the lines of business within the organization.

11. A method comprising:
    receiving, by a computing system and over a network, a request to gain access to an account maintained by an organization;
    selecting, by the computing system from a plurality of authentication tokens associated with the account and based on interaction information, an authentication token to be used in an authentication procedure in response to the request to gain access, wherein each of the plurality of authentication tokens is information that is expected to be known by the user of the account, wherein the interaction information includes information about prior authentication tokens used during a plurality of interactions associated with the account and information about a frequency of the interactions, and wherein the selected authentication token is different than the prior authentication tokens used during the plurality of interactions;

presenting a prompt for the selected authentication token; and determining, based on information received in response to presenting the prompt, whether to grant the request to authenticate.

12. The method of claim 11, wherein the authentication procedure involves a user seeking to be authenticated, and wherein presenting the prompt for the selected authentication token includes:

outputting, to a computing device operated by the user, a user interface prompting the user for the selected authentication token.

13. The method of claim 12, wherein determining whether to grant the request to authenticate includes:

receiving, from the computing device operated by the user, an indication of whether the user is authorized to access the account.

14. The method of claim 11, wherein the authentication procedure involves a user seeking to be authenticated, and wherein presenting the prompt for the selected authentication token includes:

outputting, to a computing device operated by an agent of the organization, a user interface enabling the agent to prompt the user for the selected authentication token.

15. The method of claim 14, wherein determining whether to grant the request to authenticate includes:

receiving, from the computing device operated by the agent, an indication of whether the user is authorized to access the account, wherein the selected authentication token is not disclosed to either the user or the agent.

16. The method of claim 11, wherein the authentication procedure involves a user seeking to be authenticated, and wherein presenting the prompt for the selected authentication token includes:

outputting a signal causing another computing system to output a user interface that includes the prompt, wherein the other computing system outputs the user interface to a computing device operated by the user.

17. The method of claim 16, wherein determining whether to grant the request to authenticate includes:

receiving, from the other computing system, an indication of whether the user is authorized to access the account.

18. A non-transitory computer-readable medium comprising instructions that, when executed, configure processing circuitry of a computing system to:

receive, over a network, a request to gain access to an account maintained by an organization;

select, from a plurality of authentication tokens associated with the account and based on interaction information, an authentication token to be used in an authentication procedure in response to the request to gain access, wherein each of the plurality of authentication tokens is information that is expected to be known by the user of the account, wherein the interaction information includes information about prior authentication tokens used during a plurality of interactions associated with the account and information about a frequency of the interactions, and wherein the selected authentication token is different than the prior authentication tokens used during the plurality of interactions;

present a prompt for the selected authentication token; and determine, based on information received in response to presenting the prompt, whether to grant the request to authenticate.

19. The computer-readable medium of claim 18, wherein the authentication procedure involves a user seeking to be authenticated, and wherein the instructions that present the prompt further include instructions that, when executed, configure processing circuitry of a computing system to:

output, to a computing device operated by the user, a user interface prompting the user for the selected authentication token.

20. The computer-readable medium of claim 18, wherein the authentication procedure involves a user seeking to be authenticated, and wherein the instructions that present the prompt further include instructions that, when executed, configure processing circuitry of a computing system to:

output, to a computing device operated by an agent of the organization, a user interface enabling the agent to prompt the user for the selected authentication token.

* * * * *